(12) United States Patent
Ori

(10) Patent No.: US 6,741,399 B2
(45) Date of Patent: May 25, 2004

(54) FOUR-GROUP ZOOM LENS

(75) Inventor: Tetsuya Ori, Koshigaya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/321,469

(22) Filed: Dec. 18, 2002

(65) Prior Publication Data

US 2003/0151829 A1 Aug. 14, 2003

(30) Foreign Application Priority Data

Dec. 28, 2001 (JP) ........................................ 2001-399577

(51) Int. Cl.[7] .............................................. G02B 15/14
(52) U.S. Cl. ....................................... 359/687; 359/684
(58) Field of Search ................................ 359/684, 686, 359/687

(56) References Cited

U.S. PATENT DOCUMENTS 5,940,221 A * 8/1999 Okayama et al. ........... 359/687
5,978,152 A * 11/1999 Okayama et al. ........... 359/687
6,317,272 B2   11/2001 Ori ............................. 359/687

FOREIGN PATENT DOCUMENTS

JP          11-194269           7/1999

* cited by examiner

*Primary Examiner*—David N. Spector
(74) *Attorney, Agent, or Firm*—Arnold International; Jon W. Henry; Bruce Y. Arnold

(57) ABSTRACT

A zoom lens is disclosed having four groups of positive, negative, positive, and positive refractive power, respectively, in order from the object side. The second lens group includes, in order from the object side, a biconcave or plano-concave lens, a biconcave lens, and a positive meniscus lens with its convex surface on the object side. The third lens group is a single lens having at least one surface that is aspherical. The fourth lens group includes a biconvex lens positioned between two meniscus lenses, and includes at least one surface that is aspherical. The first and third lens groups are fixed in position, the second lens group moves for zooming, and the fourth lens group moves for both zooming and focusing. A specified condition is satisfied to provide a zoom lens of small overall length, a zoom ratio that exceeds 6, a wide-angle of view, and favorably corrected aberrations.

19 Claims, 5 Drawing Sheets

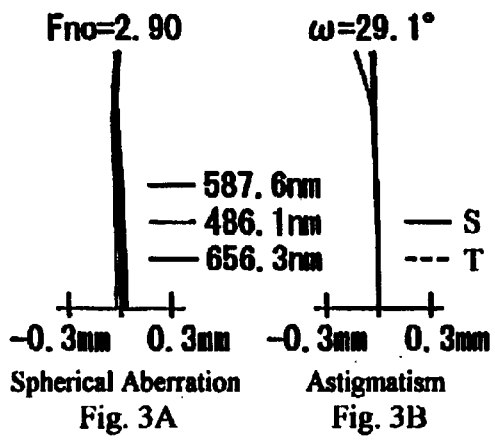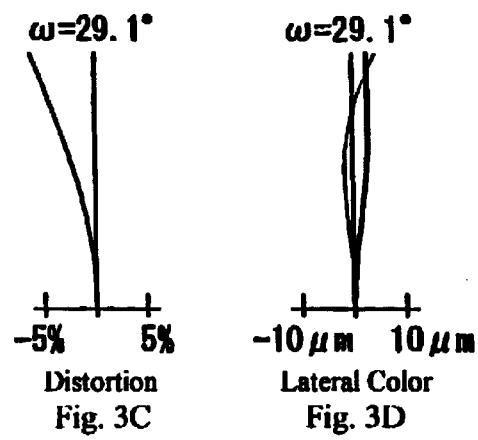
Fig. 3A Spherical Aberration
Fig. 3B Astigmatism
Fig. 3C Distortion
Fig. 3D Lateral Color
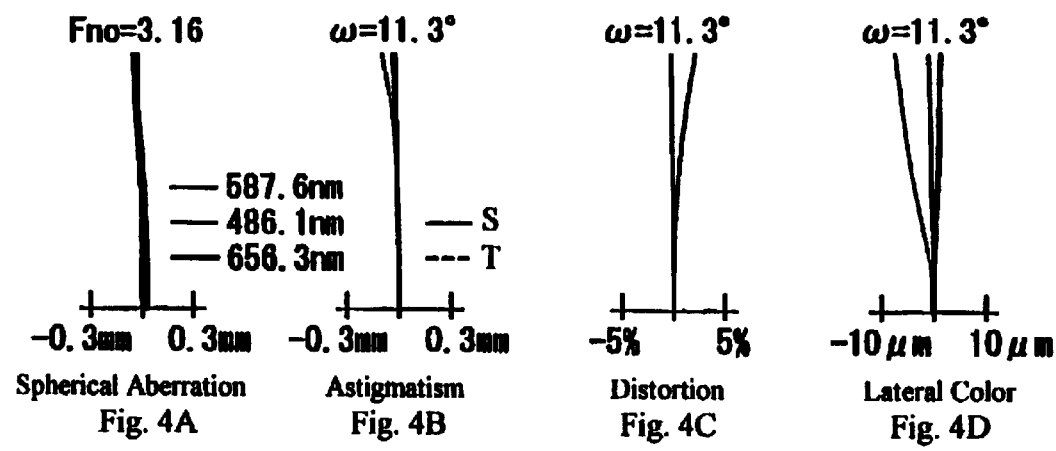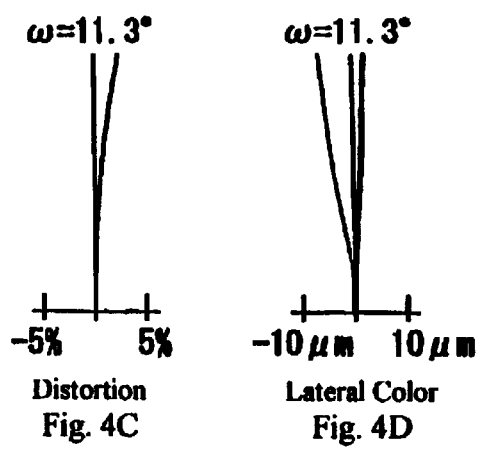
Fig. 4A Spherical Aberration
Fig. 4B Astigmatism
Fig. 4C Distortion
Fig. 4D Lateral Color

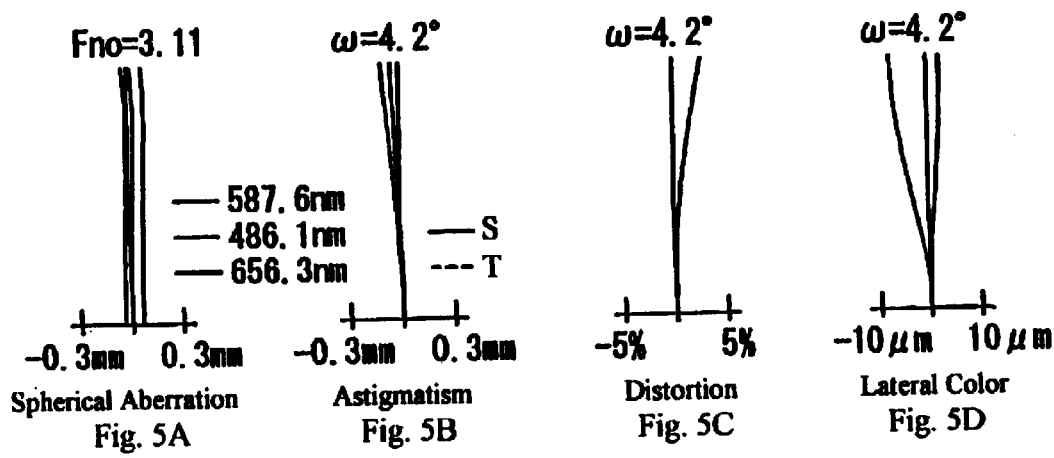
Fig. 5A Spherical Aberration
Fig. 5B Astigmatism
Fig. 5C Distortion
Fig. 5D Lateral Color
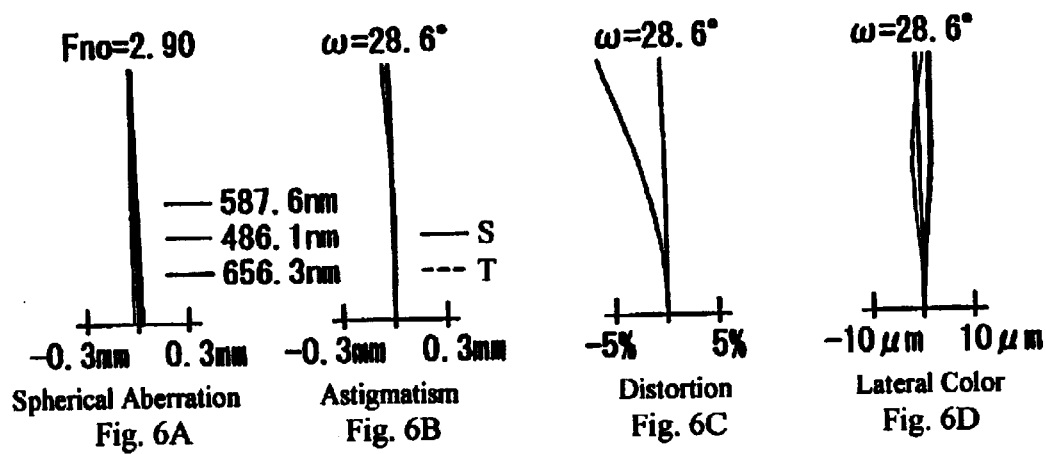
Fig. 6A Spherical Aberration
Fig. 6B Astigmatism
Fig. 6C Distortion
Fig. 6D Lateral Color

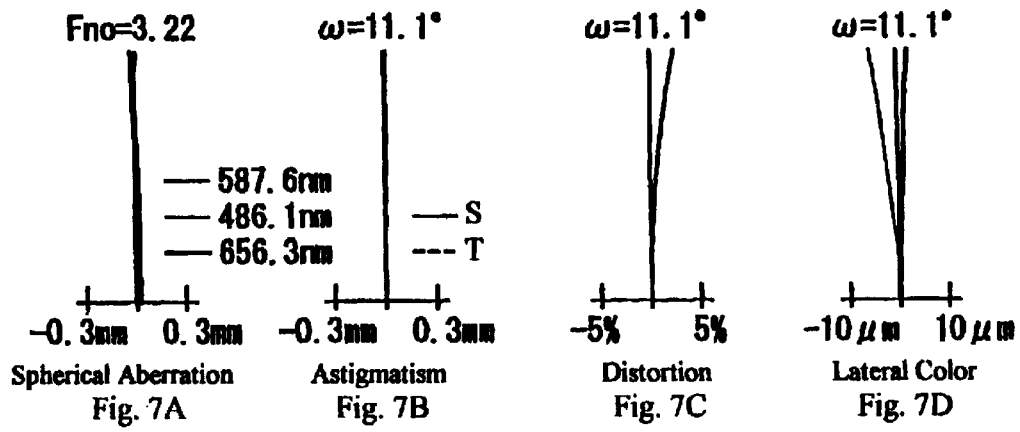
Fig. 7A Spherical Aberration
Fig. 7B Astigmatism
Fig. 7C Distortion
Fig. 7D Lateral Color
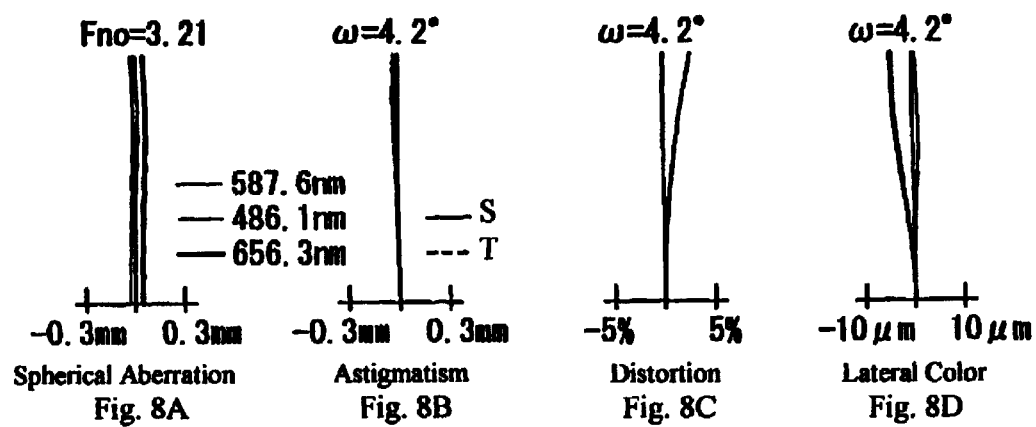
Fig. 8A Spherical Aberration
Fig. 8B Astigmatism
Fig. 8C Distortion
Fig. 8D Lateral Color

FOUR-GROUP ZOOM LENS

BACKGROUND OF THE INVENTION

Digital cameras have become remarkably popular in recent years. A digital camera converts an optical image into an electrical signal using a picture image element such as a CCD (charge-coupled device) and records such as image data. In addition to miniaturization of the picture image element and higher pixel conversion, compactness of the digital camera is demanded. As a result of this demand, there is a need for compactness of the photographic lens that is mounted into a digital camera.

A rear-focus-type zoom lens with four lens groups for use in a video camera is known. For example, a known video camera has its entire optical system formed of four lens groups, with the first lens group and the third lens group being fixed. Zooming is performed by moving the second lens group along the optical axis along with movement of the fourth lens group, and focusing is performed by moving the fourth lens group. This particular type of zoom lens has a large zoom ratio, and is disclosed, for example, in Japanese Laid Open Patent Application H11-194269.

However, conventional zoom lenses tend to be too long, and particularly in compact digital cameras, excessive length in order to obtain good optical performance is unacceptable. For example, with the zoom lens described in Japanese Laid Open Patent Application H11-194269, since the most object-side surface of the second lens group is convex, the focal length of the second lens group becomes longer, and the movement of the second lens group at the time of zooming becomes large. Therefore, the entire length of the lens becomes long, contrary to the compactness desired for an imaging lens in a digital camera.

Japanese Laid Open Patent Application 2001-215408, the inventor of which is the same as that of the present application, describes a compact zoom imaging lens for use in a digital camera with favorable optical performance having a zoom ratio of five to six. However, with that lens, the focal length of the fourth lens group is short, especially when attempting to obtain a high zoom ratio that exceeds six. Thus, large variations in aberrations occur due to focusing and correcting the image point position during zooming. Therefore, there is market demand for a zoom lens of small overall length that can achieve a high zoom ratio (i.e., in the range six to eight) with only small fluctuations in aberrations.

BRIEF SUMMARY OF THE INVENTION

The present invention is a four-group zoom lens of the rear-focus-type that is ideally suited for use in a digital still camera. More specifically, the present invention has a small overall length and a zoom ratio in the range of six to eight. The zoom lens of the present invention can be mounted in a digital camera so as to provide reduced variations in aberrations during zooming and focusing and is of shorter overall length than previous zoom lenses of comparable optical performance.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3A–3D show aberrations of Embodiment 1 of the zoom lens of the present invention at the wide-angle end;

FIGS. 4A–4D show aberrations of Embodiment 1 of the zoom lens of the present invention at an intermediate position;

FIGS. 5A–5D show aberrations of Embodiment 1 of the zoom lens of the present invention at the telephoto end;

FIGS. 6A–6D show aberrations of Embodiment 2 of the zoom lens of the present invention at the wide-angle end;

FIGS. 7A–7D show aberrations of Embodiment 2 of the zoom lens of the present invention at an intermediate position; and FIGS. 8A–8D show aberrations of Embodiment 2 of the zoom lens of the present invention at the telephoto end.

DETAILED DESCRIPTION

Figure 1:
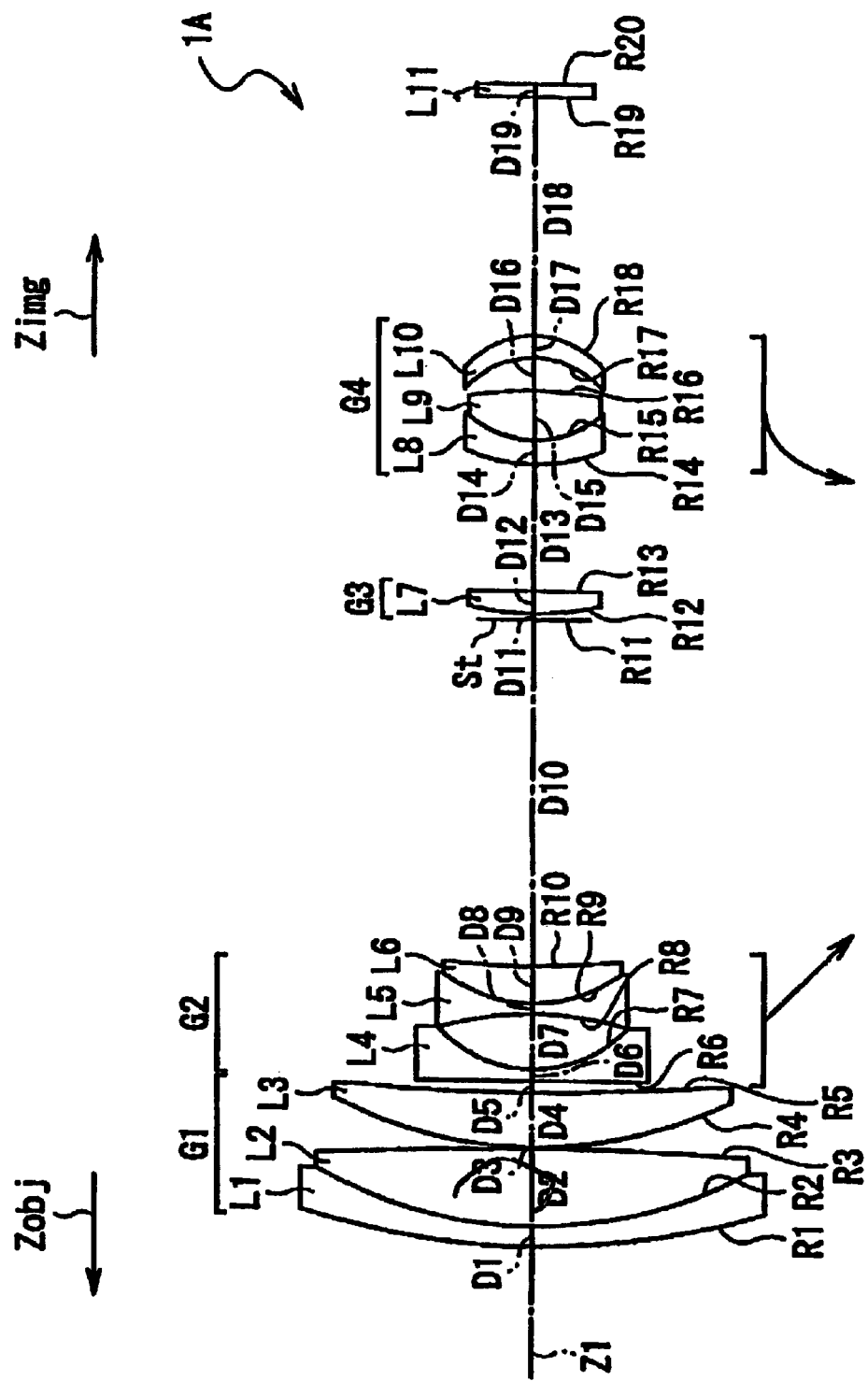
FIG. 1 shows a cross-sectional view of Embodiment 1 of the zoom lens of the present invention at the wide-angle end.

The four-group zoom lens of the present invention is formed of, in order from the object side: a first lens group having positive refractive power; a second lens group having negative refractive power; a third lens group having positive refractive power and formed of a single lens, with at least one lens surface thereof being aspherical; and a fourth lens group having positive refractive power which includes at least one lens surface that is aspherical. The first lens group and the third lens group are fixed in position. Zooming is performed by moving the second lens group along the optical axis. The position of the image surface is corrected for both zooming and focusing at different object distances by moving the fourth lens group along the optical axis. The second lens group is formed of, in order from the object side: a biconcave or plano-concave lens, with the concave surface or the flat surface on the object side; a biconcave lens; and a positive meniscus lens with its convex surface on the object side. The adjacent lens surfaces of the last-mentioned biconcave lens and the positive meniscus lens with its convex surface on the object side each have the same curvature and are either in contact or separated by a thin layer of transparent adhesive (too thin to be considered in optical computations) that fixes the lenses together. Further, the following condition is satisfied:

$$3.1 < f4/fw < 3.6 \quad \text{Condition (1)}$$

where f4 is the focal length of the fourth lens group, and fw is the focal length of the zoom lens at the wide-angle end.

Those surfaces that are aspherical satisfy the following equation:

$$Z = [CY^2/\{1+(1-KC^2Y^2)^{1/2}\}] + A_4Y^4 + A_6Y^6 + A_8Y^8 + A_{10}Y^{10} \quad \text{(Equation A)}$$

where

Z is the length (in mm) of a line drawn from a point on the aspherical surface at a distance Y from the optical axis to the tangential plane of the aspherical surface vertex, $C(=1/R)$ is the curvature of the aspherical surface near the optical axis, Y is the distance (in mm) from the optical axis, K is the eccentricity, and $A_4$, $A_6$, $A_8$, and $A_{10}$ are the 4th, 6th, 8th, and 10th aspherical coefficients.

With the zoom lens of the present invention, the overall lens length is shortened while achieving a high zoom ratio (for example, a zoom ratio exceeding six). A wide-angle field of view field is obtained by forming the second lens group of, in order from the object side: a biconcave or plano-concave lens, with the flat surface or the concave surface on the object side; a biconcave lens; and a positive meniscus lens with its convex surface on the object side. Thus, a zoom lens that is highly desirable for use in a compact digital camera is realized. In the zoom lens of the present invention, the fluctuations in aberrations while focusing and zooming, even over a zoom ratio that exceeds six, can be kept small by satisfying Condition (1) above.

In a zoom lens of the present invention, preferably the fourth lens group is formed of, in order from the object side, a negative meniscus lens with its convex surface on the object side, a biconvex lens, and a single lens with at least one side thereof being aspheric. Further, preferably the single lens of the third lens group is a plastic lens. In addition, preferably, the fourth lens group includes at least one plastic lens.

By using a plastic lens in either the third lens group or the fourth lens group, lens manufacturing costs can be reduced. Especially with the third lens group or the fourth lens group, which each includes at least one aspherical lens surface, the costs of processing the aspheric lens surfaces can be reduced by forming the lens of plastic. Using a single lens in the third lens group also helps reduce production costs.

Two embodiments of the present invention will now be described with reference to the drawings.

Embodiment 1

FIG. 1 shows the basic lens element configuration and lens group positions at the wide-angle end of the four-group zoom lens 1A of Embodiment 1. In FIG. 1, Zobj is the object side, Zimg is the image side, and Z1 is the optical axis. The optical surfaces are numbered, in order from the object side, and their radii of curvature are indicated by R1 through R20 in a similar manner. Similarly, the lens elements are numbered as L1 through L10. The on-axis surface spacings of all the optical surfaces are numbered from the object side and are indicated by D1–D19. The four lens groups are indicated by upper brackets labeled G1–G4, in order from the object side. Two lower brackets and directional arrows indicate the general movement of lens group G2 during zooming, and of lens group G4 during zooming and focusing. A diaphragm aperture, or stop, St is provided between the second lens group G2 and the third lens group G3, and an image sensor, such as a CCD array, is arranged at the image surface of the zoom lens 1A and protected by a cover glass L11. The zoom lens 1A of Embodiment 1 is designed for mounting in a compact digital camera.

In zoom lens 1A of Embodiment 1, the first lens group G1 and the third lens group G3 are fixed in position. Further, zooming is performed by causing the second lens group G2 to move along the direction of the optical axis Z1 as indicated by the arrow, when zooming from the wide-angle end to the telephoto end. By causing the fourth lens group G4 to move along the optical axis as generally indicated by the arrow when zooming from the wide-angle end to the telephoto end, focusing is corrected for both zooming and for different object positions.

The first lens group G1 has positive refractive power. This first lens group G1 is formed of, in order from the object side, a first lens L1, a second lens L2, and a third lens L3. The first lens L1 is a negative meniscus lens with its convex surface on the object side. The second lens L2 is a biconvex lens. The adjacent lens surfaces of lenses L1 and L2 have the same curvature and are fixed together in contact with one another or are separated by a thin layer of transparent adhesive (too thin to be considered in optical computations) that fixes the lenses together. The third lens L3 of the first lens group G1 is formed of a positive meniscus lens with its convex surface on the object side.

The second lens group G2 has negative refractive power. This second lens group G2 is formed of, in order from the object side: a biconcave or plano-concave lens L4 with its flat or concave surface on the object side; a biconcave lens L5, and a positive meniscus lens L6 with its convex surface on the object side. The fifth lens L5 and the sixth lens L6 have the same curvature and are either in contact with one another or are separated by a thin layer of transparent adhesive (too thin to be considered in optical computations) that fixes the lenses together.

The third lens group G3 has a positive refractive power. This third lens group G3 is formed of a single lens L7 with at least one lens surface thereof being aspheric. Preferably, for ease of manufacture, the single lens is made of plastic.

The fourth lens group G4 has positive refractive power. This fourth lens group G4 includes a lens with at least one surface thereof being aspheric. The fourth lens group G4 is formed of, in order from the object side: a negative meniscus lens L8 with its convex surface on the object side, a biconvex lens L9, and a single lens L10 having at least one side thereof aspheric. The adjacent lens surfaces of lenses L8 and L9 have the same curvature and are either in contact or separated by a thin layer of transparent adhesive (too thin to be considered in optical computations) that fixes the lenses together. Lens L10 has a meniscus shape with its convex surface on the image side. Preferably, for ease of manufacture, the fourth lens group G4 includes a plastic lens. More particularly, the lens L10 is preferably made of plastic.

Importantly, the zoom lens 1A of Embodiment 1 satisfies Condition (1) above.

A description of the optical operation and efficacy brought about by the zoom lens 1A being of the above composition will now be provided.

The zoom lens 1A maintains the first lens group G1 and the third lens group G3 in fixed positions. Focusing is performed by moving the second lens group G2 along the optical axis toward the image side when zooming from the wide-angle end to the telephoto end. The fourth lens group G4 is moved along the optical axis toward the object side when zooming from the wide-angle end to the telephoto end and also moves along the optical axis in order to maintain the image surface at a constant position when focusing at objects of different object distance.

By constructing the second lens group G2 of the zoom lens 1A as a biconcave or piano-concave lens L4 with its flat or concave surface on the object side, a biconcave lens L5, and a positive meniscus lens L6 with its convex surface on the object side, it is possible to achieve a high zoom ratio, such as greater than six times, and while providing a wide-angle of view and maintaining a shortened overall lens length. In this way, a compact mounting within a compact digital camera is realized.

By satisfying the above Condition (1), variations in aberrations are reduced. If the limits of the ratio of Condition (1) are exceeded, the power of the fourth lens group G4 is so weak that this lens group must be moved farther during focusing and zooming, thereby undesirably lengthening the entire zoom lens 1A. If the power of the fourth lens group G4 is so strong that the ratio is too small to satisfy Condition (1), the variations in aberrations with focusing and zooming become too great. Thus, by satisfying Condition (1), a shortened overall length of the zoom lens with reduced variations in aberrations is achieved.

In addition, because the fourth lens group G4 is formed of a negative meniscus lens L8 with its convex surface on the object side, a biconvex lens L9, and a single lens L10 having at least one surface thereof aspheric, excellent optical performance during zooming and focusing is achieved. Further, by using a plastic lens in the third lens group G3 or in the fourth lens group G4, the manufacturing costs of the lenses can be reduced, especially if the lens has a lens surface with an aspheric shape. Generally, the optical performance of plastic lenses varies greatly with environmental conditions. For example, the focal length varies greatly with temperature and relative humidity, and the amount of variation increases with increasing refractive power. Therefore, preferably, a lens that is made of plastic should have a comparatively low refractive power. In this way, the deterioration of the optical performance caused by changes in the environment can be reduced.

By making the third lens group G3 (which is placed near the diaphragm St), have an aspheric shape, correction of aberrations, especially spherical aberration, is made easier. Additionally, by making the image-side surface of the tenth lens L10 ashperical, the correction of curvature of field and distortion is made easier.

In this manner, the zoom lens of the present invention achieves a high optical performance and is particularly suited for use in a compact digital camera in that it has a short overall length and provides a high zoom ratio and a wide-angle field of view while reducing variations in aberrations with focusing and zooming.

Table 1 below lists the surface number #, in order from the object side, the radius of curvature R (in mm) of each surface near the optical axis, the on-axis surface spacing D (in mm), as well as the refractive index $N_d$ and the Abbe number $\nu_d$ (at the d line) of each lens element for Embodiment 1. The bottom portion of Table 1 lists the range of the focal length f, the range of the f-number $F_{NO}$, and the picture angle $2\omega$ for Embodiment 1.

TABLE 1

| # | R | D | $N_d$ | $\nu_d$ |
|---|---|---|---|---|
| 1 | 58.1612 | 1.50000 | 1.84666 | 23.8 |
| 2 | 33.1810 | 5.87000 | 1.48749 | 70.2 |
| 3 | −305.0649 | 0.10000 | | |
| 4 | 32.6423 | 4.16000 | 1.71300 | 53.9 |
| 5 | 145.0819 | D5 (variable) | | |
| 6 | −2531.0900 | 0.91000 | 1.88300 | 40.8 |
| 7 | 9.6159 | 4.32925 | | |
| 8 | −24.5502 | 0.81000 | 1.51823 | 58.9 |
| 9 | 11.2210 | 2.84000 | 1.84666 | 23.8 |
| 10 | 54.4711 | D10 (variable) | | |
| 11 (stop) | ∞ | 0.50000 | | |
| 12* | 19.4008 | 1.80000 | 1.50869 | 56.0 |
| 13* | ∞ | D13 (variable) | | |

TABLE 1-continued

| # | R | D | $N_d$ | $\nu_d$ |
|---|---|---|---|---|
| 14 | 13.6465 | 1.80000 | 1.84666 | 23.8 |
| 15 | 7.7900 | 3.75000 | 1.48749 | 70.4 |
| 16 | −29.1202 | 2.49829 | | |
| 17 | −6.9234 | 1.66000 | 1.50869 | 56.0 |
| 18* | −6.5822 | D18 (variable) | | |
| 19 | ∞ | 1.05000 | 1.51680 | 64.2 |
| 20 | ∞ | | | |
| f = 7.99–58.97 | | $F_{NO}$ = 2.90–3.11 | | $2\omega$ = 58.2°–8.6° |

Those surfaces with a * to the right of the surface number in Table 1 are aspherical surfaces, and the aspherical surface shape is expressed by Equation (A) above.

Table 2 below lists the values of the constants K, $A_4$, $A_6$, $A_8$, and $A_{10}$ used in Equation (A) above for each of the aspherical surfaces indicated in Table 1. An "E" in the data indicates that the number following the "E" is the exponent to the base 10. For example, "1.0E-02" represents the number $1.0 \times 10^{-2}$.

TABLE 2

| # | K | $A_4$ | $A_6$ | $A_8$ | $A_{10}$ |
|---|---|---|---|---|---|
| 12 | 0.8035159148 | −1.320198156E−5 | −6.449070872E−6 | 2.128593676E−7 | −4.134684466E−9 |
| 13 | 1.000000000 | 1.545664698E−5 | −7.272509553E−6 | 2.497520223E−7 | −4.531561882E−9 |
| 18 | −0.3184336782 | −4.201494996E−4 | −2.214633189E−6 | −7.301553360E−8 | −7.908777967E−11 |

As is apparent from Tables 1 and 2 and FIG. 1, in the zoom lens of Embodiment 1, surface #12 and surface #13 (i.e., both sides of lens L7 of the third lens group G3), and surface #18 (namely, the image-side surface of the tenth lens L10) are aspherical. To facilitate ease of manufacture, both the seventh lens L7 and the tenth lens L10 are made of plastic.

In the zoom lens 1A of Embodiment 1, the second lens group G2 and the fourth lens group G4 move during zooming. Therefore, the values of the on-axis spacings D5, D10, D13, and D18 between the lens groups change with zooming. Table 3 below lists the values of the variables D5, D10, D13, and D18 (i.e, the group spacings) at the wide-angle end (f=7.99 mm), at an intermediate focal length (f=21.73 mm), and at the telephoto end (f=58.97).

TABLE 3

| f | D5 | D10 | D13 | D18 |
|---|---|---|---|---|
| 7.99 | 1.000 | 26.649 | 9.713 | 18.074 |
| 21.73 | 14.842 | 12.807 | 5.181 | 22.606 |
| 58.97 | 24.860 | 2.788 | 5.804 | 21.982 |

The zoom lens 1A of Embodiment 1A has a ratio for f4/fw, at the wide-angle end, of 3.215. Thus, Condition (1) above is satisfied for this embodiment.

FIGS. 3A–3D show the spherical aberration, astigmatism, distortion, and lateral color, respectively, of the zoom lens of Embodiment 1 at the wide-angle end. FIGS. 4A–4D show the spherical aberration, astigmatism, distortion, lateral color, respectively, of the zoom lens of Embodiment 1 at the intermediate focal length, and FIGS. 5A–5D show the spherical aberration, astigmatism, distortion, and lateral color, respectively, of the zoom lens of Embodiment 1 at the telephoto end. In FIGS. 3B, 4B and 5B, the astigmatism is shown for both the sagittal image surface S and the tangential image surface T. In FIGS. 3A, 4A, and 5A the spherical aberration is shown for the wavelengths 587.6 nm (the d-line), 486.1 nm (the F-line), 656.3 nm (the C-line). In the remaining figures, the aberrations illustrated are for the d line, and ω is the half-picture angle. As is apparent from these figures, the various aberrations are favorably corrected.

Embodiment 2

Figure 2:
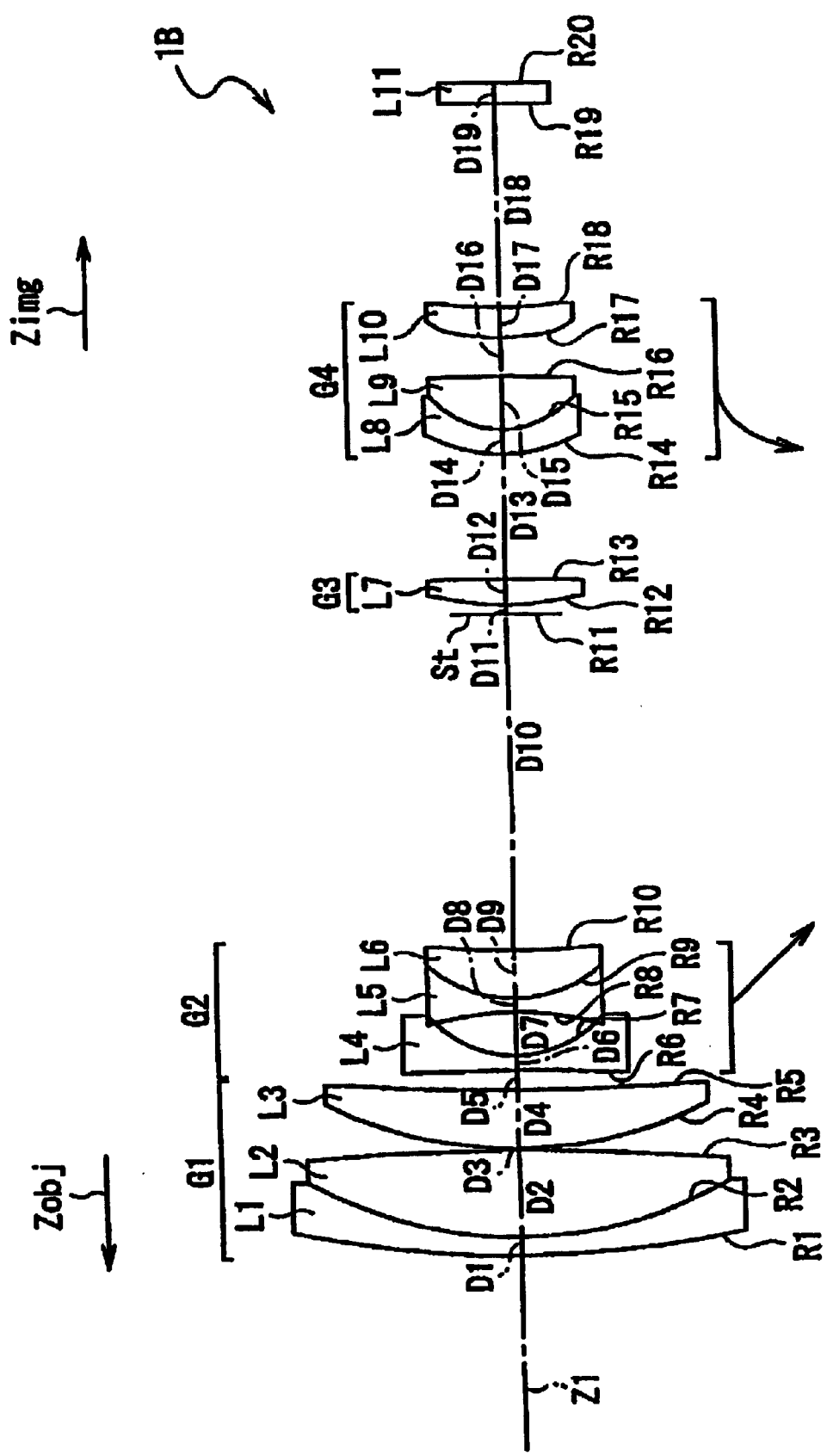
FIG. 2 shows a cross-sectional view of Embodiment 2 of the zoom lens of the present invention at the wide-angle end.

FIG. 2 shows the basic lens element configuration and lens group positions at the wide-angle end of the four-group zoom lens 1 of Embodiment 2. Because Embodiment 2 is very similar to Embodiment 1, primarily only differences between Embodiment 2 and Embodiment 1 will be explained for Embodiment 2.

One major difference of Embodiment 2 from Embodiment 1 involves the tenth lens L10 arranged at the extreme image side of the fourth lens group G4. In Embodiment 1, the tenth lens L10 has a meniscus shape with its convex surface on the image side. In Embodiment 2, the tenth lens L10 has a meniscus shape with its convex surface on the object side. Additionally, as will be described hereafter, in contrast to Embodiment 1 where only the image-side surface of the tenth lens L10 is aspherical, in Embodiment 2, both sides of the tenth lens L10 (i.e., surface #17 and surface #18) are aspherical.

Table 4 below lists the surface number #, in order from the object side, the radius of curvature R (in mm) of each surface near the optical axis, the on-axis surface spacing D (in mm), as well as the refractive index $N_d$ and the Abbe number $v_d$ (at the d line) of each lens element for Embodiment 2. The bottom portion of Table 4 lists the range of the focal length f, the range of the f-number $F_{NO}$, and the picture angle 2ω for Embodiment 2.

TABLE 4

| # | R | D | $N_d$ | $v_d$ |
|---|---|---|---|---|
| 1 | 54.1449 | 0.95000 | 1.84666 | 23.8 |
| 2 | 21.6922 | 4.43000 | 1.48749 | 70.2 |
| 3 | −118.7829 | 0.10000 | | |
| 4 | 21.7934 | 2.96000 | 1.83481 | 42.7 |
| 5 | 117.1507 | D5 (variable) | | |
| 6 | −158.2170 | 0.75000 | 1.88300 | 40.8 |
| 7 | 5.9690 | 2.20175 | | |
| 8 | −17.2038 | 0.71000 | 1.51742 | 52.4 |
| 9 | 6.7018 | 2.50000 | 1.84666 | 23.8 |
| 10 | 36.2107 | D10 (variable) | | |
| 11 (stop) | ∞ | 0.50000 | | |
| 12* | 13.3022 | 1.35000 | 1.50869 | 56.0 |
| 13* | ∞ | D13 (variable) | | |
| 14 | 8.3216 | 1.25000 | 1.84666 | 23.8 |
| 15 | 4.9922 | 2.70000 | 1.48749 | 70.2 |
| 16 | −93.6505 | 2.00000 | | |
| 17* | 17.8569 | 1.48000 | 1.50869 | 56.0 |
| 18* | 96.7902 | D18 (variable) | | |

TABLE 4-continued

| # | R | D | $N_d$ | $v_d$ |
|---|---|---|---|---|
| 19 | ∞ | 1.05000 | 1.51680 | 64.2 |
| 20 | ∞ | | | | f = 5.20–38.40   $F_{NO}$ = 2.90–3.20   2ω = 57.3°–8.5°

Those surfaces with a * to the right of the surface number in Table 4 are aspherical, and the aspherical surface shape is expressed by Equation (A) above.

Table 5 below lists the values of the constants K, $A_4$, $A_6$, $A_8$, and $A_{10}$ used in Equation (A) above for each of the aspherical surfaces indicated in Table 4. An "E" in the data indicates that the number following the "E" is the exponent to the base 10. For example, "1.0E-02" represents the number $1.0 \times 10^{-2}$.

TABLE 5

| H | K | $A_4$ | $A_6$ | $A_8$ | $A_{10}$ |
|---|---|---|---|---|---|
| 12 | 0.7983413543 | 2.285233617E−4 | −8.131216416E−5 | 5.630240565E−6 | −2.019571750E−7 |
| 13 | 1.000195613 | 3.194483082E−4 | −7.946290130E−5 | 5.23042626E−6 | −1.812197872E−7 |
| 17 | 0.6926783716 | 1.446991682E−3 | 1.206702688E−5 | 1.984995699E−6 | 8.814154965E−8 |
| 18 | −0.6025427553 | 1.746853975E−3 | 1.405105530E−5 | 1.877577002E−6 | 2.630426744E−7 |

As shown in Tables 4 and 5 above, in the zoom lens of Embodiment 2, both sides of the seventh lens L7 (surface #12 and surface #13) and both sides of the tenth lens L10 (surface #17 and surface #18) are aspherical. For ease of manufacture, both of these lenses are made of plastic.

In the zoom lens 1B of Embodiment 2, the second lens group G2 and the fourth lens group G4 move during zooming. Therefore, the values of the on-axis spacings D5, D10, D13, and D18 between the lens groups change with zooming. Table 6 below lists the values of the variables D5, D10, D13, and D18 (i.e, the group spacings) at the wide-angle end (f=5.20 mm), at an intermediate focal length (f=14.15 mm), and at the telephoto end (f=38.39).

TABLE 6

| f | D5 | D10 | D13 | D18 |
|---|---|---|---|---|
| 5.20 | 1.000 | 17.552 | 6.538 | 18.485 |
| 14.15 | 9.816 | 8.737 | 3.446 | 13.577 |
| 38.39 | 16.265 | 2.287 | 3.608 | 13.416 |

The zoom lens 1B of Embodiment 2 has a ratio for f4/fw, at the wide-angle end, of 3.318. Thus, Condition (1) above is satisfied for this embodiment.

FIGS. 6A–6D show the spherical aberration, astigmatism, distortion, and lateral color, respectively, of the zoom lens of Embodiment 2 at the wide-angle end. FIGS. 7A–7D show the spherical aberration, astigmatism, distortion, lateral color, respectively, of the zoom lens of Embodiment 2 at the intermediate focal length, and FIGS. 8A–8D show the spherical aberration, astigmatism, distortion, and lateral color, respectively, of the zoom lens of Embodiment 2 at the telephoto end. In FIGS. 6B, 7B and 8B, the astigmatism is shown for both the sagittal image surface S and the tangential image surface T. In FIGS. 6A, 7A, and 8A the spherical aberration is shown for the wavelengths 587.6 nm (the d-line), 486.1 nm (the F-line), 656.3 nm (the C-line). In the remaining figures, the aberrations illustrated are for the d line, and ω is the half-picture angle. As is apparent from these figures, the various aberrations are favorably corrected.

The present invention is not limited to the aforementioned embodiments, as it will be obvious that various alternative implementations are possible. For instance, values such as the radius of curvature R of each of the lens components, the surface spacings D, the refractive index N, as well as the Abbe number $v_d$, are not limited to the examples indicated in each of the aforementioned embodiments, as other values can be adopted. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A four-group zoom lens comprising, in order from the object side:
    a first lens group having positive refractive power;
    a second lens group having negative refractive power that includes, from the object side, a biconcave or a plano-concave lens with the flat surface of the plano-concave lens or the concave surface of the biconcave lens facing the object side, another biconcave lens, and a positive meniscus lens with its convex surface facing the object side, the adjacent lens surfaces of the positive meniscus lens and said another biconcave lens having the same curvature and being fixed together in contact with one another or separated by a layer of transparent adhesive that fixes the lenses together;
    a third lens group having positive refractive power and consisting of a single lens with at least one lens surface thereof being aspherical;
    a fourth lens group having positive refractive power and at least one lens surface that is aspherical;
    wherein
    the first lens group and the third lens group are fixed in position;
    the second lens group is moved along the optical axis when zooming;
    the fourth lens group is moved along the optical axis for both focusing and zooming;
    and the following condition is satisfied:

$3.1 < f4/fw < 3.6$ where
    f4 is the focal length of the fourth lens group, and
    fw is the focal length of the zoom lens at the wide-angle end.

2. The zoom lens of claim 1, wherein the fourth lens group includes, in order from the object side:
    a negative meniscus lens with its convex surface on the object side;
    a biconvex lens, with the adjacent lens surfaces of the negative meniscus lens and the biconvex lens having the same curvature and being in contact or separated by a thin layer of transparent adhesive that holds the lenses together; and
    a single lens with at least one lens surface thereof being aspherical.

3. The zoom lens of claim 1, wherein the single lens of the third lens group is a plastic lens.

4. The zoom lens of claim 2, wherein the single lens of the third lens group is a plastic lens.

5. The zoom lens of claim 1, wherein the fourth lens group includes at least one plastic lens.

6. The zoom lens of claim 2, wherein the fourth lens group includes at least one plastic lens.

7. The zoom lens of claim 3, wherein the fourth lens group includes at least one plastic lens.

8. The zoom lens of claim 4, wherein the fourth lens group includes at least one plastic lens.

9. The zoom lens of claim 1, wherein the fourth lens group includes a meniscus lens with its convex surface on the image side.

10. The zoom lens of claim 9, wherein the convex surface of the meniscus lens of the fourth lens group is aspherical.

11. The zoom lens of claim 2, wherein the single lens of the fourth lens group is a meniscus lens.

12. The zoom lens of claim 1, wherein the fourth lens group includes a meniscus lens having a lens surface that is aspherical.

13. The zoom lens of claim 12, wherein the aspherical surface of the meniscus lens of the fourth lens group is on the image side.

14. The zoom lens of claim 12, wherein the meniscus lens of the fourth lens group has both its object-side surface and its image-side surfaces aspherical.

15. The zoom lens of claim 13, wherein the meniscus lens of the fourth lens group has both its object-side surface and its image-side surfaces aspherical.

16. The zoom lens of claim 1, wherein both lens surfaces of the single lens of the third lens group are aspherical.

17. The zoom lens of claim 2, wherein both lens surfaces of the single lens of the third lens group are aspherical.

18. The zoom lens of claim 1, wherein the adjacent lens surfaces of the second lens group, namely, the adjacent surfaces of the positive meniscus lens and a biconcave lens having the same curvature, are fixed together by a thin layer of transparent adhesive.

19. The zoom lens of claim 2, wherein the adjacent lens surfaces of the second lens group, namely, the adjacent surfaces of the positive meniscus lens and a biconcave lens having the same curvature, are fixed together by a thin layer of transparent adhesive.

* * * * *